INVENTORS
William R. Harding, Jr.
& Allan S. Gelb
BY
Frederick Shapoe
ATTORNEY

United States Patent Office 3,129,117

Patented Apr. 14, 1964

3,129,117

THERMOELECTRIC MATERIALS AND THEIR PRODUCTION BY POWDERED METALLURGY TECHNIQUES

William R. Harding, Jr., Jeannette, and Allan S. Gelb, Greensburg, Pa., assignors to Westinghouse Electric Corporation, East Pittsburgh, Pa., a corporation of Pennsylvania Filed Aug. 12, 1960, Ser. No. 49,359

8 Claims. (Cl. 136—5)

This invention relates to a new and improved process for the preparation of thermoelectric elements and to the elements produced.

In the past, thermoelectric materials have generally been prepared by one of three processes: (1) single or refined crystal growth, for example by the Bridgman technique, (2) casting, and (3) powder metallurgy techniques. The last technique, powder metallurgy, may be practiced for example by admixing materials in compactable particle form, compacting the particles and thereafter generally heat treating the compacts to effect sintering. It has been the invariable practice to compact the particles into a solid member by applying pressure in one direction and then placing electrical contacts on the compressed ends of the solid member so that electrical flow in the finished elements is in a direction parallel to the direction of the previously applied pressure or compaction.

The Bridgman technique, used primarily for single crystal growth or to produce large oriented grains, is costly, difficult to control and has other shortcomings well known to those skilled in the art.

The various casting processes generally produce a polycrystalline material. These materials usually have a coarse grain structure, are ordinarily quite brittle so that they will shatter upon moderate eccentric loading, have a low thermoelectric efficiency and are characterized by other shortcomings known to those skilled in the art.

The powder metallurgy process has been generally well received in the industry. However, some thermoelectric elements products by this process, notably those produced from non-cubic crystalline structure anisotropic materials, for example, both basic and doped bismuth telluride, bismuth antimony telluride, bismuth antimony telluride selenides and indium telluride compounds, usually exhibit relatively high electrical resistivities. Since the figure of merit (Z) of thermoelectric materials is defined by the equation:

$$Z=\frac{S^2}{pK}$$

wherein:

$S$=Seebeck coefficient (V./° C.)
$K$=thermal conductivity (watts/cm.° C.)
$p$=resistivity (ohm-cm.), it is obvious that the higher the resistivity ($p$) the lower will be the figure of merit (Z) of any particular material.

The surprising discovery has now been made that the electrical resistivity ($p$) of non-cubic anisotropic thermoelectric materials prepared by powdered metallurgy techniques, is reduced by a factor ranging up to 4 in a direction perpendicular to the direction of application of the compacting force producing the compressed element, as compared to the resistivity parallel to the direction of the applied compacting force. The customary and apparently logical procedure has been to pass electrical current through compacts in the same direction as that in which they have been compacted. Possibly this has been due to the fact that it would be reasonable that the resistivity would be least in the compacting direction.

An object of the present invention is to provide a new and improved thermoelectric element prepared from compacts of finely divided anisotropic intermetallic materials by applying electrical contacts to the compact faces which are parallel to the direction in which the compacting forces were applied so that electric current applied between the contacts, flows in a direct perpendicular to the compacting direction.

Another object of the present invention is to provide a novel process for the preparation of thermoelectric elements having improved thermoelectric properties from anisotropic intermetallic materials in compactable particle form by compacting a quantity of the particles of the material with pressure applied to the compactable particles in a given direction, and then applying electrical contacts to faces of the resulting compact which faces are parallel to the direction of the previous compaction, whereby, the flow of electric current passing between the contacts through the element when used in a thermoelectric device is in a direction perpendicular to the direction in which the compacting pressure was applied.

Another object of the present invention is to provide a novel process for the preparation of improved thermoelectric elements from anisotropic intermetallic materials in flake-like compactable particle form by compacting a quantity of the particles in a given direction, heat treating the compacts, and thereafter applying electrical contacts to faces of the compact which faces are parallel to the given direction of the previous compaction, whereby, the direction of electric current flow between the contacts through the element when used in a thermoelectric device in perpendicular to the given direction.

A still further object of the present invention is to provide a new and improved process for the preparation of thermoelectric elements from an anisotropic intermetallic material in compactable particle form by compacting a quantity of the material with a force applied to the compactable particles in a given direction annealing or hot pressing the compacts, coining the compacts, and applying electrical contacts to faces of the compacts which faces are parallel to the given direction of compaction, whereby electrical current flowing between the contacts passes in a direction perpendicular to the given direction of compaction, and in use in thermoelectric device the thermal gradient will be perpendicular to the direction of compaction.

Other objects of the present invention will, in part, appear hereinafter and will, in part, be obvious.

For a better understanding of the nature and objects of the invention, reference should be had to the following detailed description and drawings in which.

Figure 1:
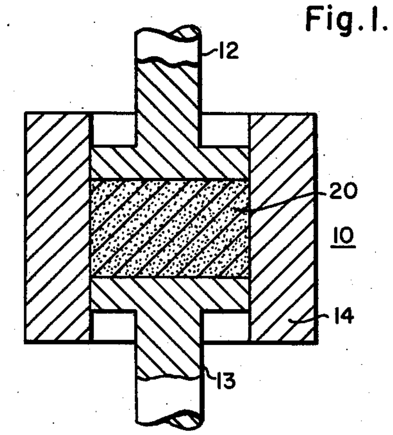
FIGURE 1 is a side view, in cross section, of a punch and die system suitable for use in accordance with the teachings of this invention.

In accordance with the present invention and attainment of the foregoing objects there is provided, a process for preparing a thermoelectric element having greatly improved thermoelectric properties comprised of a compact of an anisotropic intermetallic thermoelectric material in compactable form, the steps comprising compacting a quantity of the anisotropic material into a body by applying a compacting pressure to the compactable particles in a given direction, and applying electrical contacts to at least one of two opposite faces of the compact which are parallel to said given direction. In the resulting thermoelectric element, the flow of electrical current and the thermal gradient will be in a direction perpendicular to the given direction of compaction.

One particularly suitable class of material for use in the thermoelectric element prepared by the process has the compound formula:

$$A_{2(1-X)}B_{2X}Te_{3(1-Y)}Se_{3Y}+\text{doping agent}$$

wherein A is at least one element selected from the group consisting of bismuth, thallium and indium, B is at least one element selected from the group consisting of antimony arsenic, and bismuth and X and Y vary from 0 to 1.

The doping material may consist of at least one material selected from the group consisting of lead, germanium, silver, cesium, iodine, bromine, chlorine, sulfur, tin and mercury, the total quantity of doping material not exceeding 0.5% by weight of the compact.

The thermoelectric compositions to be employed in practicing the invention have anisotropic properties. In general, the compositions are physically anisotropic so that when crushed or fractured they tend to form platelets or flake-like particles—in some cases resembling mica in this respect. The thermoelectric compositions may be prepared by melting or sintering processes which produce more or less massive bodies. These bodies must be broken down into a finely divided flake-like powder. Apparatus should be used which will give the maximum proportion of flake-like particles. A disk pulverizer has been used with success with the aforementioned compounds. It will be understood, however, that flake-like powders from any source may be employed in practicing the invention. However, due to anisotropic physical properties, spherical particles may be caused to cleave in the proper direction during compaction so as to line up the structure of the body satisfactorily for this invention.

The particle size of the thermoelectric materials must be rather fine such that the finished compact or pellet can be handled without readily breaking up. Satisfactory pellets have been made employing particles having an average size of 50 mesh (U.S. sieve series) and finer. Excellent compacts or pellets have resulted when particles having an average particle size of 200 mesh (U.S. sieve series) have been employed.

In a preferred form of the process of this invention, the elements of the composition to be fabricated into compacts or pellets may be first alloyed or reacted by melting the melt allowed to solidify, and then divided in, for example, a disc pulverizer, preferably into the flake-like compactable particles having the desired size.

With reference to FIG. 1, there is illustrated a die member 10 comprised of a top piston 12, a bottom piston 13 and a cylinder member 14. The cavity within the cylinder member 14 is preferably of rectangular configuration but may be square or of any other similar or suitable geometrical configuration. A quantity 20 of the material, which is to be formed into a thermoelectric compact, in the form of flake-like compactable particles is charged into the cavity within the cylinder member 14 upon the face of piston 13. The cylinder 14 and pistons 12 and 13 may be comprised of steel or any other material capable of withstanding a compacting pressure of a magnitude of the order of tons per square inch as will be described herein.

Figure 2:
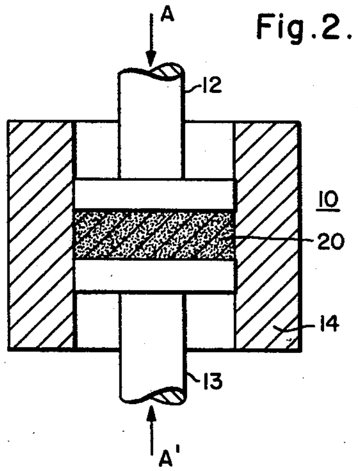
FIG. 2 is a side view, in cross section, of a thermoelectric pellet being formed within the punch and die system of FIG. 1 in accordance with the teachings of this invention.

With reference to FIG. 2, the quantity 20 of the material in compactable flake-like particle form, is charged into the cavity within the cylinder 14 and is compacted by a pressure applied by pistons 12 and 13 in a vertical direction. The direction of the application of pressure is indicated by arrows A and A′ in FIG. 2. The compaction is carried out at a pressure of from 5 to 1000 tons per square inch, and preferably at about 15 to 100 tons per square inch. The pressure may be created by hydraulic means, mechanical means or by any other suitable means known to those skilled in the art.

Figure 3:
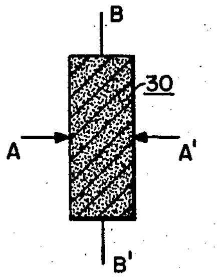
FIG. 3 is a side view of a thermoelectric element prepared in accordance with the teachings of this invention.

With reference to FIG. 3, there is illustrated a compact or pellet 30 suitable for use in preparing a thermoelectric device in accordance with the teachings of this invention. The arrows labeled A and A′ indicate the direction in which the compacting force has been applied, and the arrows labeled B and B′ indicate the desired direction of electrical current flow when the pellet is employed in a thermoelectric device.

The compact or pellet 30 thus prepared are preferably heat treated following the pressing. The heat treating serves to increase the mechanical properties and thereby facilitate handling and subsequent processing. More importantly, the heat treatment greatly reduces the electrical resistivity and improves the thermoelectric properties. The compact or pellet may be heat treated in any one of three ways (1) annealing, (2) hot pressing, and (3) hot coining, or in any combination of two or more of these treatments.

In annealing, the compact or pellet is sealed in an evacuated chamber, for example in a bulb comprised of quartz or other suitable inert material in which there has been established a vacuum of from $10^{-2}$ to $10^{-5}$ mm. Hg, or which has been evacuated and back filled with an inert gas such for example as argon or helium and heated at a temperature of from 300° C. to 450° C. for from 1 to 96 hours. Excellent results have been realized with pellets annealed in a vacuum at a temperature of from 350° C. to 380° C. for from 10 hours at 380° C. to 40 hours at 350° C.

In hot pressing, the compact or pellets is pressed at a pressure of from 1000 to 10,000 p.s.i. while at a temperature of from 300° C. to 450° C. The pressure applied during hot pressing may be applied in a direction either parallel or perpendicular to the direction of eventual flow of an electrical current through the pellet but preferably perpendicular to the direction of conventional current flow. During the hot pressing, electrical contacts comprised of for example nickel, steel, Kovar, aluminum or the like may be joined to the faces of the compact in accordance with the procedure set forth in U.S. patent application Serial No. 11,673, filed February 29, 1960, the assignee of which is the same as that of the present invention.

In coining, the compact is heated to a temperature within the range of from 300° C. to 400° C. and "bumped" with a suddenly applied and released pressure of about 3000 p.s.i. and higher, applied to the confined compact. The only restriction on the pressure is that it not be so great as to break up the compact.

Figure 4:
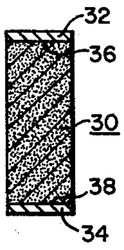
FIG. 4 is a side view of the thermoelectric element of FIG. 3 to which electrical contacts have been affixed.

If the electrical contacts are not joined to the compact during hot pressing, or if the element is not hot pressed, electrical contacts may be applied after the conclusion of the heat treatment by any process known to those skilled in the art, for example by soldering, brazing, electroplating, ultrasonic soldering, electroless plating, flame spraying of metal, or the like. With reference to FIG. 4, there is illustrated the pellet 30 of FIG. 3 to which electrical contacts 32 and 34 have been affixed.

The electrical contacts 32 and 34 are affixed to surfaces 36 and 38 respectively, which surfaces are parallel to the direction A and A′ which is the direction in which the compacting pressure was applied to originally form the compact.

While it is not completely understood what occurs during the pressing of the thermoelectric materials, the following possible explantion is offered. During the formation of the pellets by compaction, due to the slipping and sliding of the cleavage planes of the platelet structure of the material, the cleavage planes tend to align themselves in a direction perpendicular to the direction of compaction. It has been found that the electrical resistivity of the compacts thus prepared is such that the resistivity in a direction perpendicular to the cleavage planes is approximately equal to from about 2 to 4 times the resistivity parallel to the cleavage planes. Probably as a result of the oriented alignment of the cleavage planes upon compaction, it has been discovered and it is upon this discovery that the present invention is based, that the pressed material particularly after heat treatment, has better thermoelectric properties i.e., lower resistivity perpendicular to the direction of compaction than in the direction of compaction. It is to be understood that regardless of the explanation, the unexpected results obtained have been realized by practicing the process as set forth.

Figure 5:
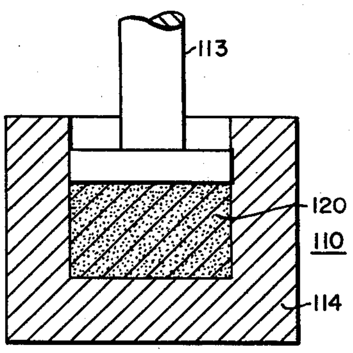
FIG. 5 is a side view, in cross-section, of a modified punch and die system suitable for use in accordance with the teachings of this invention.

With reference to FIG. 5, there is illustrated a modified die member 110 comprised of single piston 113 and a hollow base member 114 suitable for use in accordance with the teachings of this invention. When the die member 110 is employed, compactable material 120 is charged into the cavity within the base member 114 and compacted by a pressure applied thorugh the piston 113. While it is believed that the best compacts are prepared by use of the apparatus illustrated in FIG. 1, material compacted by the apparatus of FIG. 5 exhibits thermoelectric properties in the lateral direction which are superior to the properties in the compacting direction.

Figure 6:
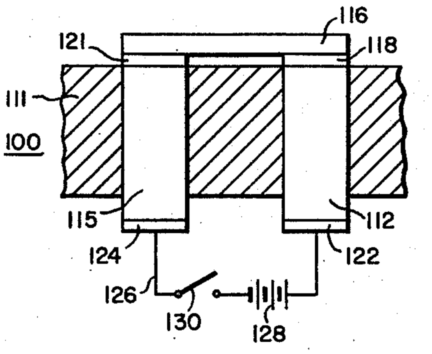
FIG. 6 is a plan view, in partial cross-section, of a thermoelectric device comprised of at least one thermoelectric element prepared in accordance with the teachings of this invention.

With reference to FIG. 6 of the drawing, there is illustrated a thermoelectric device 100 suitable for cooling or heating an enclosed space in accordance with the Peltier effect. A thermally insulating wall 111 so formed as to provide a suitable chamber is perforated to permit the passage therethrough of a positive (p-type) thermoelement 112 for example, one from a compact having the formula $Bi_{.52}Sb_{1.28}Te_3$+0.1% Pb+3% excess Te prepared in accordance with the teachings of this invention, and a negative (n-type) thermoelement member 115 for example, one from a compact having the formula $$Bi_2Te_{2.6}Se_{.6}+0.05\%\ CuBr$$

and also prepared in accordance with the teachings of this invention. An electrically conducting strip of metal 116, for example, copper, silver or the like, is joined to an end face 118 of the member 112 and an end face 121 of member 115 the end faces 118 and 121 being those parallel to the direction of compacting of the members, to provide good electrical and thermal contact between the members. The end faces 118 and 121 may be initially coated with a thin layer of metal, for example by vacuum evaporation or by the use of ultrasonic brazing whereby good electrical contact is obtained between strip 116 and the members 112 and 115. The metal strip 116 may be provided with suitable fins or other extended surface means for better heat equilibrium with the chamber in which it is disposed.

At the other end of member 112, there is attached a metal plate or strip 122 by brazing or soldering in the same manner as was employed in attaching strip 116 to the end faces 118 and 121. Similarly, a metal strip or plate 124 may be connected to the other end of member 115. The plate 122 and 124 may be provided with fins or other cooling means whereby they dissipate heat developed during the operation of the thermoelectric device 100 to the ambient.

An electrical conductor 126 in circuit with a D.C. power source 128 and a switch 130 is electrically connected to the end plates 122 and 124. When the switch 130 is moved to the closed position an electric current flows between members 112 and 115, whereby, cooling is affected on the metal plates 118, 121 and 116 and heat is removed at the metal plates or strips 122 and 124.

It will be appreciated that a plurality of pairs of negative and positive members may be joined in series in order to produce a thermoelectric device comprised of a plurality of cooperating thermoelements. The cold junction of each of these joined thermoelements will be placed in a chamber to be cooled while the hot junction will be so disposed that heat will be dissipated therefrom during the operation of the device.

The following examples are illustrative of the practice of this invention.

*Example I*

48.753 grams of bismuth, 5.526 grams of selenium, 35.721 grams of tellurium and 0.045 gram of copper bromide were admixed to a state of homogeniety and reacted. The resulting solid reaction product was reduced in particle size with a disk pulverizer so that there was produced a flake-like powder of an average particle size of 200 mesh (U.S. sieve series).

The powder was then charged into a die member of the type illustrated in FIGS. 1 and 2 and compacted with a pressure of about 100 tons per square inch into a pellet weighing 90 grams, and having a density of 7.55 grams per cubic centimeter.

The pellet thus prepared was then sealed in a quartz bulb and annealed in a vacuum of $10^{-5}$ mm. Hg at a temperature of 350° C. for 24 hours.

Silver electrical contacts were then brazed to opposite surfaces of the pellet, these surfaces being those surfaces that are parallel to the direction in which the compacting pressure was applied.

The resistivity of the pellet was then determined in a direction perpendicular to the direction in which the compacting force was applied. The resistivity was found to be $1.24\times10^{-3}$ ohm-cm.

Contacts were applied to a duplicate pellet, identical to the first pellet, to faces perpendicular to the direction of compression of the pellet. The element thus prepared was found to have a resistivity of $2.78\times10^{-3}$ ohm-cm.

The latter pellet, prepared in accordance with the prior art techniques, had a resistivity greater than 2.24 times the resistivity of the first pellet embodying the teachings of this invention.

*Example II*

The procedure of Example I was repeated except that the pellets were not annealed after compaction. The pellet prepared in accordance with the teachings of this invention, the compacting force being applied perpendicular to the direction of subsequent current flow, had a resistivity of $14\times10^{-3}$ ohm-cm. The pellet prepared in accordance with prior art teachings, the compaction force being applied in a direction parallel to the direction of subsequent current flow, had a resistivity of $43\times10^{-3}$ ohm-cm.

By following the teachings of this invention it was possible to reduce the resistivity by a factor of about 3.1.

By referring to the specification and specific examples it is clear that the objects of this invention set forth herein above have been achieved.

It will be appreciated that the above description and drawings are only exemplary and not exhaustive of the invention, and that substitutions, modifications and the like may be made without detracting from the scope of this invention.

We claim as our invention:

1. A process for preparing a thermoelectric element comprised of a compact of at least one anisotropic intermetallic thermoelectric material comprising, admixing predetermined amounts of at least one anisotropic intermetallic material in compactable particle form, compacting the admixed anisotropic materials into a compacted body by applying a compacting pressure to the particles in a first direction, said first direction being perpendicular to the direction in which an electrical current will flow through the compacted body when at least a portion of the compacted body is employed as a thermoelectric element in a thermoelectric device, heat treating the compact, and applying electrical contacts to at least one of two opposite surfaces which are parallel to said first direction.

2. A process for preparing a thermoelectric element comprised of a compact of at least one anisotropic intermetallic thermoelectric material comprising, admixing predetermined amounts of at least one anisotropic intermetallic material in a compactable particle form, compacting the admixed anisotropic material into a compacted body by applying a compacting pressure to the particles in a first direction, said first direction being perpendicular to the direction in which the electrical current will flow through the compacted body when at least a portion of the compacted body is employed as a thermoelectric element in a thermoelectric device, annealing the compact, and thereafter applying electrical contacts to at least one of two opposite surfaces which are parallel to said first direction.

3. A process for preparing a thermoelectric element comprised of a compact of at least one anisotropic intermetallic thermoelectric material comprising, admixing predetermined amounts of at least one anisotropic intermetallic materials in compactable particle form, compacting the admixed anisotropic materials into a compacted body by applying a compacting pressure of from 5 to 1000 tons per square inch, said compacting pressure being applied in a first direction, said first direction being perpendicular to the direction in which an electrical current will flow through the compacted body when at least a portion of the compacted body is employed as a thermoelectric element in a thermoelectric device, annealing the compact at a temperature of from 300° C. to 450° C. for from 1 hour to 96 hours, and thereafter applying electrical contacts to at least one of two opposite surfaces which are parallel to said first direction.

4. A process for preparing a thermoelectric element comprised of a compact of at least one anisotropic intermetallic thermoelectric material comprising, admixing predetermined amounts of at least one anisotropic intermetallic material in compactable particle form, compacting the admixed anisotropic material into a compacted body by applying a compacting pressure to the particles in a first direction, said first direction being perpendicular to the direction in which an electrical current will flow through the compacted body when at least a portion of the compacted body is employed as a thermoelectric element in a thermoelectric device, annealing the compact at a temperature of from 300° C. to 450° C. for from 1 hour to 96 hours, hot pressing the compact at a temperature of from 300° C. to 500° C. with a pressure of from 1000 p.s.i. to 10,00 p.s.i., and thereafter applying electrical contacts to at least one of two opposite surfaces which are parallel to said first direction.

5. A process for preparing a thermoelectric element comprised of a compact of at least one anisotropic intermetallic thermoelectric material comprising, admixing predetermined amounts of at least one anisotropic intermetallic thermoelectric material comprising, admixing predetermined amounts of at least one anisotropic intermetallic material in compactable particle form, compacting the admixed anisotropic material into a compacted body by applying a compacting pressure of from 5 to 1000 tons per square inch in a first direction, said first direction being perpendicular to the direction in which the electrical current will flow through the compacted body when at least a portion of the compacted body is employed as a thermoelectric element in a thermoelectric device, annealing the compact at a temperature of from 300° C. to 450° C. for from 1 hour to 96 hours, coining the compact at a temperature of from 300° C. to 400° C. and a pressure of from about 3000 p.s.i. to 10,000 p.s.i., and thereafter applying electrical contacts to at least one of two opposite surfaces which are parallel to said first direction.

6. A process for preparing a thermoelectric element comprised of a compact of at least one anisotropic intermetallic thermoelectric material comprising, admixing predetermined amounts of at least one anisotropic intermetallic materials in compactable particle form, compacting the admixed anisotropic materials into a compacted body by applying a compacting pressure to the particles in a first direction, said first direction being perpendicular to the direction in which an electrical current will flow through the compacted body when at least a portion of the compacted body is employed as a thermoelectric element in a thermoelectric device, thereafter hot pressing the compact at a temperature of from 300° C. to 500° C. and with a pressure of from 2000 to 10,000 p.s.i., coining the compact at a temperature of from 300° C. to 400° C. at a pressure of from about 3000 p.s.i. to about 10,000 p.s.i., and thereafter applying elecrtical contacts to at least one of two opposite surfaces which are parallel to said first direction.

7. A thermoelectric device in which at least one thermoelectric element is comprised of an anisotropic intermetallic thermoelectric material which has been formed by compacting an admixture of at least two anisotropic intermetallic materials with a compacting force which was applied perpendicular to the direction of electric current flow through the thermoelectric element within the thermoelectric device.

8. A thermoelectric device in which at least one p-type and at least one n-type thermoelectric element is an anisotropic intermetallic thermoelectric material which has been formed by compacting an admixture of at least two anisotropic intermetallic material with a compacting force which was applied perpendicular to the direction of electrical current flow through the thermoelectric elements within the thermoelectric device.

References Cited in the file of this patent

UNITED STATES PATENTS 2,952,980 Douglas ---------------- Sept. 20, 1960

FOREIGN PATENTS 807,619 Great Britain ------------ Jan. 21, 1959

OTHER REFERENCES

Horne: RCA Technical Note No. 305, November 1959.